(12) United States Patent
Pattikonda

(10) Patent No.: US 7,651,220 B1
(45) Date of Patent: Jan. 26, 2010

(54) SELECTIVE SYSTEM FOR BLOCKING GLARE IN A SPECIFIC LOCATION OF A USER'S FIELD OF VISION

(76) Inventor: Ram Pattikonda, 3208 Springbranch Dr., Richardson, TX (US) 75082

( * ) Notice: Subject to any disclaimer, the term of this patent is extended or adjusted under 35 U.S.C. 154(b) by 431 days.

(21) Appl. No.: 11/556,779

(22) Filed: Nov. 6, 2006

Related U.S. Application Data

(60) Provisional application No. 60/733,814, filed on Nov. 7, 2005.

(51) Int. Cl.
*G02C 7/10* (2006.01)
(52) U.S. Cl. ................................................. 351/163
(58) Field of Classification Search .......... 351/163–165
See application file for complete search history.

(56) References Cited

U.S. PATENT DOCUMENTS 5,478,239 A * 12/1995 Fuerst et al. ................. 473/438
2006/0140502 A1   6/2006 Tseng et al.
2006/0158715 A1   7/2006 Furusawa et al.

* cited by examiner

*Primary Examiner*—Darryl J Collins
(74) *Attorney, Agent, or Firm*—Michael Diaz

(57) ABSTRACT

A glare blocking system for selectively blocking specified glare spots. The system includes a transmission control material for selectively darkening a portion of the material and an electronics module for commanding the transmission control material to darken a specified area of the transmission control material. The system also includes a power source providing power to the electronic module and the transmission control material. The electronics module determines the specified area to be darkened upon the transmission control material to block a detected glare spot from view by a user. When a glare spot is detected, the specified area to be darkened corresponding to a detected glare spot is determined and the electronic module directs the specified area of the transmission control material to be darkened to block the detected glare spot from view by the user. In one embodiment, the glare blocking system includes a camera to capture an image seen through the transmission control material. Glare spots may then be detected on the captured image. The system may be used on goggles, visors, mirrors or as a panel having separate manual controls to select the areas to darken.

25 Claims, 18 Drawing Sheets

FIG. 2
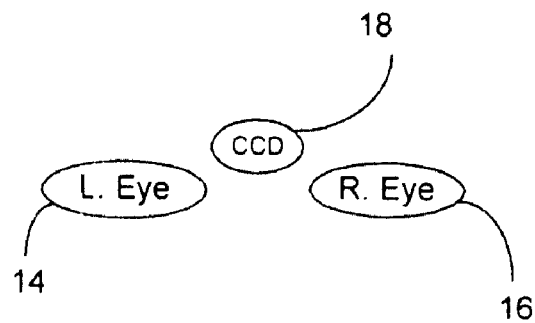
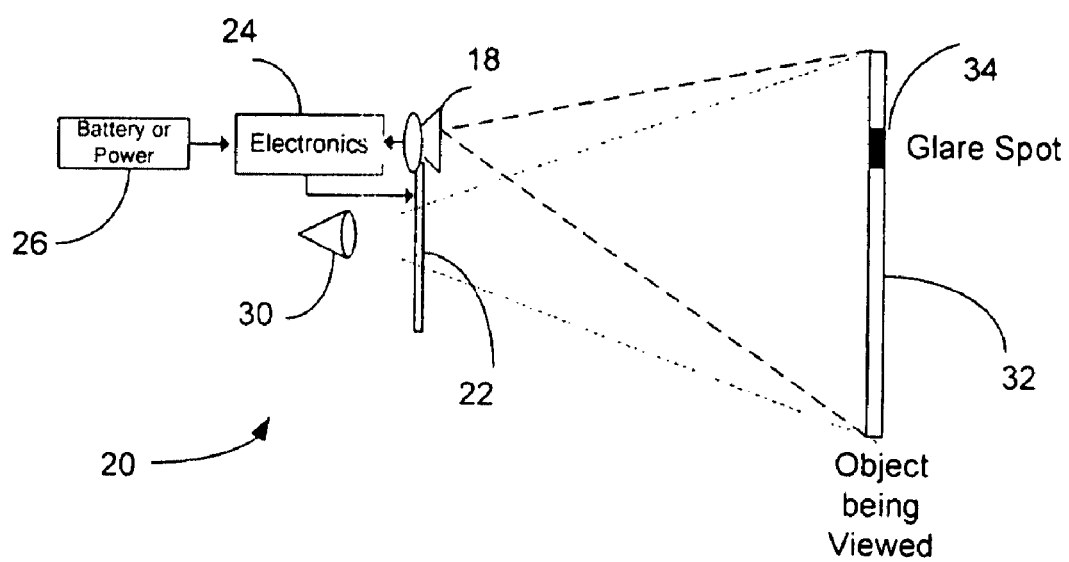
FIG. 3

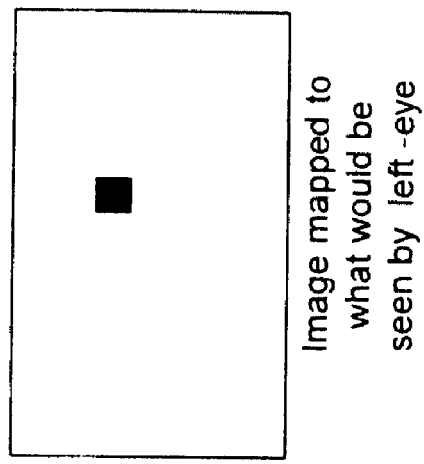
FIG. 5C Image mapped to what would be seen by left-eye
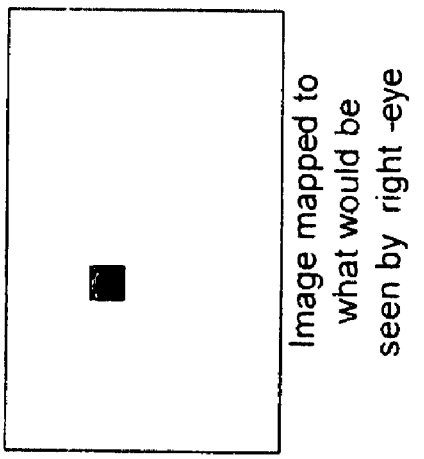
FIG. 5B Image mapped to what would be seen by right-eye
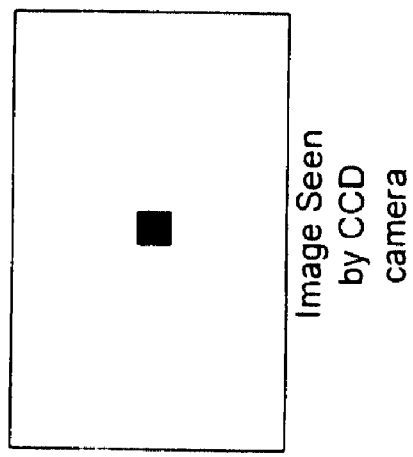
FIG. 5A Image Seen by CCD camera

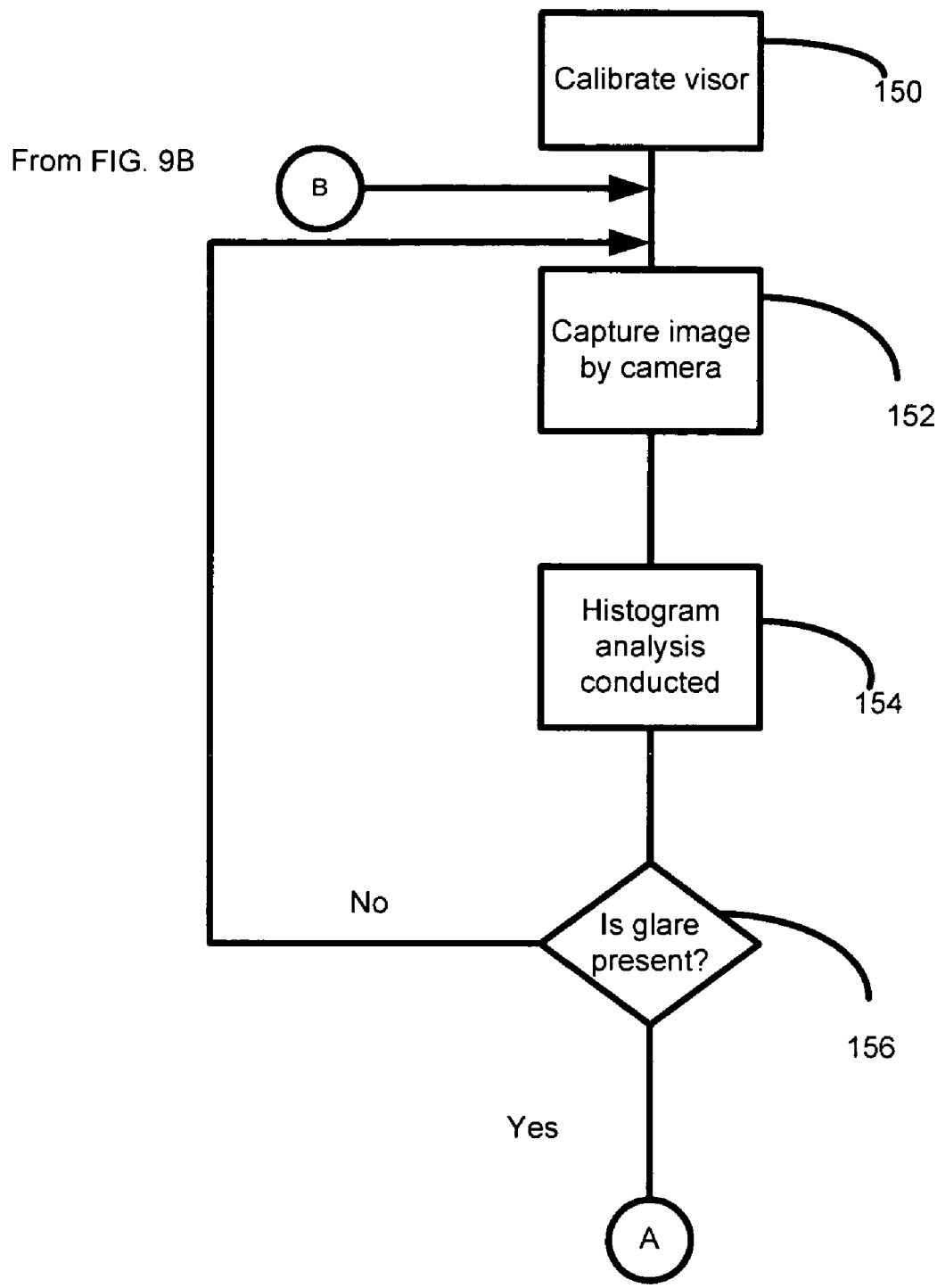

SELECTIVE SYSTEM FOR BLOCKING GLARE IN A SPECIFIC LOCATION OF A USER'S FIELD OF VISION

RELATED APPLICATIONS

This utility application claims the benefit of U.S. Provisional Patent Application Ser. No. 60/733,814 by Ram Pattikonda, filed Nov. 7, 2005, and is hereby incorporated by reference.

BACKGROUND OF THE INVENTION

1. Field of the Invention

This invention relates to glare blocking systems. Specifically, and not by way of limitation, the present invention relates to a system for selectively blocking glare from a specific location within a user's field of vision utilizing a transmission control material.

2. Description of the Related Art

It is quite common for people to encounter glare in their field of vision while accomplishing various tasks, such as driving, flying or other outdoor activities. The glare can be an annoyance or a hindrance to accomplishing a task, and in many situations, is dangerous to performing certain tasks. For example, when driving, a driver may be driving towards the sun in such a position that the vision of the person is obstructed by the bright glare. In another example, a welder must weld an object while encountering the bright glare emitted from the welder's arc. Obviously, with reduced vision, catastrophes may result.

The traditional approach to solving this problem is to provide a dark transparent material for use on visors or glasses to reduce the glare and provide some enhanced vision. However, there are many deficiencies with the use of tinted glasses or goggles. First, the tinted glasses or goggles cannot be used at night because the user's entire field of vision is darkened. When it is dark outside, the user's vision is reduced by the use of the tinted glasses or goggles. Additionally, even in the daytime, the user's vision is reduced because the glasses or goggles do not selectively block the glare. Rather, tinted glasses and goggles darken the entire field of vision, which decreases the visibility of those areas for the user's field of vision for which there is no glare. A system and apparatus is needed which selectively blocks glare in specific locations of the user's field of vision.

Although there are no known prior art teachings of an apparatus such as that disclosed herein, prior art references that discuss subject matter that bears some relation to matters discussed herein are U.S. Patent Application Publication No. 2006/0158715 to Furusawa et al. (Furusawa) and U.S. Patent Application Publication No. 2006/0140502 to Tseng et al. (Tseng).

Furusawa discloses a variable transmissivity window system having a camera for detecting light form a light source, a transmissivity control unit for controlling the transmissivity of light passed through a vehicle's windshield and a transmissivity modifying unit for modifying the transmissivity of each block into which the windshield is divided. The transmissivity control unit calculates a position of the windshield block for the transmissivity to be modified. However, Furusawa does not disclose goggles which provide separate material for each eye which independently blocks glare for each eye. Additionally, Furusawa does not teach or suggest a system which selectively blocks glare for a mirror. Furusawa also does not utilize histograms to detect the glare from the camera image. Furusawa also suffers from the limitation of being only useable on a vehicle. In addition, Furusawa does not teach or suggest detecting the eye position of the user during calibration. Furusawa also does not disclose providing an enhanced field of view by selectively darkening different areas with different grayscales. Furthermore, Furusawa does not teach or suggest displaying information on a transmission control material. Furusawa also fails to disclose using the transmission control material as sunglasses.

Tseng discloses a field of vision processing and filtering system for eliminating glare from mobile and transient light sources and reflective surface by using an image recording, eye-position detection device and an active matrix screen as a dynamically controlled visor. Tseng merely discloses the use of a visor and does not disclose goggles which independently blocks glare for each eye. Additionally, Tseng does not teach or suggest a system which selectively blocks glare for a mirror. Similarly to Furusawa, Tseng also does not utilize histograms to detect the glare from the camera image. Tseng also does not disclose detecting the eye position using calibration or selectively darkening different areas with different grayscales to provide more uniform viewing by the user. Additionally, Tseng does not teach or suggest a display providing information on a transmission control material. Tseng also does not disclose using the transmission control material as sunglasses.

Thus, there is a need for a system which selectively blocks glare from a specific location and normalizes the intensities of an image to provide an enhanced view in the user's field of vision and which uniquely utilizes histograms and may be implemented in goggles, mirrors and other devices. Additionally, a system is needed which detects eye position for calibration, displays information on a transmission control material and enhances portions of an image. It is an object of the present invention to provide such a system and apparatus.

SUMMARY OF THE INVENTION

In one aspect, the present invention is a glare blocking system for selectively blocking specified glare spots. The system includes a transmission control material for selectively darkening a portion of the material and an electronics module for commanding the transmission control material to darken a specified area of the transmission control material. The system also includes a power source providing power to the electronic module and the transmission control material. The electronics module determines the specified area to be darkened upon the transmission control material to block a detected glare spot from view by a user. When a glare spot is detected, the specified area to be darkened corresponding to a detected glare spot is determined and the electronic module directs the specified area of the transmission control material to be darkened to block the detected glare spot from view by the user.

In one embodiment, the glare blocking system includes a camera to capture an image seen through the transmission control material. Glare spots may then be detected on the captured image. The system may be used on goggles, visors, mirrors or as a panel having separate manual controls to select the areas to darken.

In another aspect, the present invention is a method of selectively blocking specified glare spots. The method begins by capturing an image by a camera. Next, a histogram analysis of the captured image is conducted to determine a location of any glare spots on the image. The method then maps any detected glare spots on a transmission control material and computes a specified area to darken to block the glare spot on the transmission control material from view by a user. A control signal is then sent by an electronics module to darken the specified area to block the glare spot from view by the user.

BRIEF DESCRIPTION OF THE DRAWINGS

FIG. 2 is a simplified block diagram illustrating the relational positioning of the lenses with the CCD camera of FIG. 1;

FIG. 3 is a simplified block diagram of the selective glare blocking system utilized with the goggles of FIG. 1;

FIG. 5A illustrates a location of the glare spot as seen by the CCD camera.

FIG. 5B illustrates an image mapped upon the transmission control material as seen by the right eye of the user.

FIG. 5C illustrates an image mapped upon the transmission control material as seen by the left eye of the user;

FIGS. 9A-9B are flow charts outlining the steps for blocking glare spots on the visor in the first alternate embodiment of the present invention;

DESCRIPTION OF THE INVENTION

Figure 1:
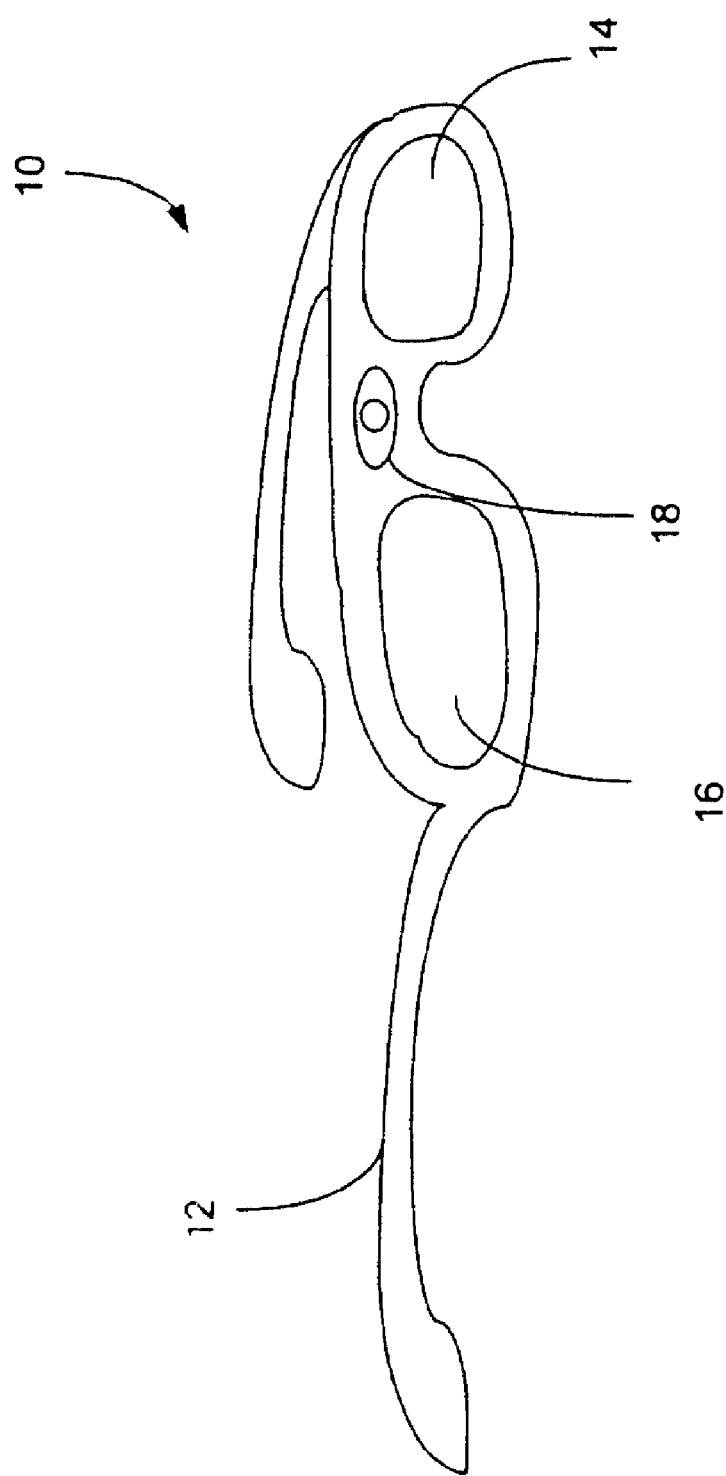
FIG. 1 is a front perspective view of selective glare blocking goggles in the preferred embodiment of the present invention.

The present invention is a system for selectively blocking glare from a specific location within a user's field of vision. FIG. 1 is a front perspective view of selective glare blocking goggles 10 in the preferred embodiment of the present invention. The goggles include a frame 12 have a left lens 14 and a right lens 16. The goggles preferably include a front viewing miniature camera, such as a Charged Coupled Device (CCD) camera 18.

FIG. 2 is a simplified block diagram illustrating the relational positioning of the lenses 14 and 16 with the CCD camera 18 of FIG. 1. In the preferred embodiment, the CCD camera is positioned between and above the lenses. However, in alternate embodiments of the present invention, the CCD camera may be located anywhere upon the goggles.

FIG. 3 is a simplified block diagram of a selective glare blocking system 20 utilized within the goggles 10 of FIG. 1. The system includes a transmission control material 22, an electronics module 24 having a processor (not shown), the CCD camera 18, and a power source 26. In regards to the goggles 10 of FIG. 1, the transmission control material 22 is located in both lenses 14 and 16. The transmission control material is a transparent material, such as LCD glass which darkens (tints) in specified areas to assist in blocking glare. The transmission control material utilizes LCD or electrochromic technology to darken the specified areas on the material. The electronics and power source may be incorporated in the same location as the CCD camera, which is preferably located between and above the lenses. As shown in FIG. 3, the user's eye 30 is located on one side of the transmission control material. For ease of understanding, only one eye is shown, however it should be understood that the system 20 which utilizes the goggles, includes separate transmission control material for each lens and the user's eyes are located behind the respective lenses. Upon the opposite side from the user is an object 32. As is typically the situation with glare, glare is located at a glare spot 34 (or bright spot). It should be understood that the glare spot's location varies, depending on the position of the sun or light source and the position of the user.

Figure 4:
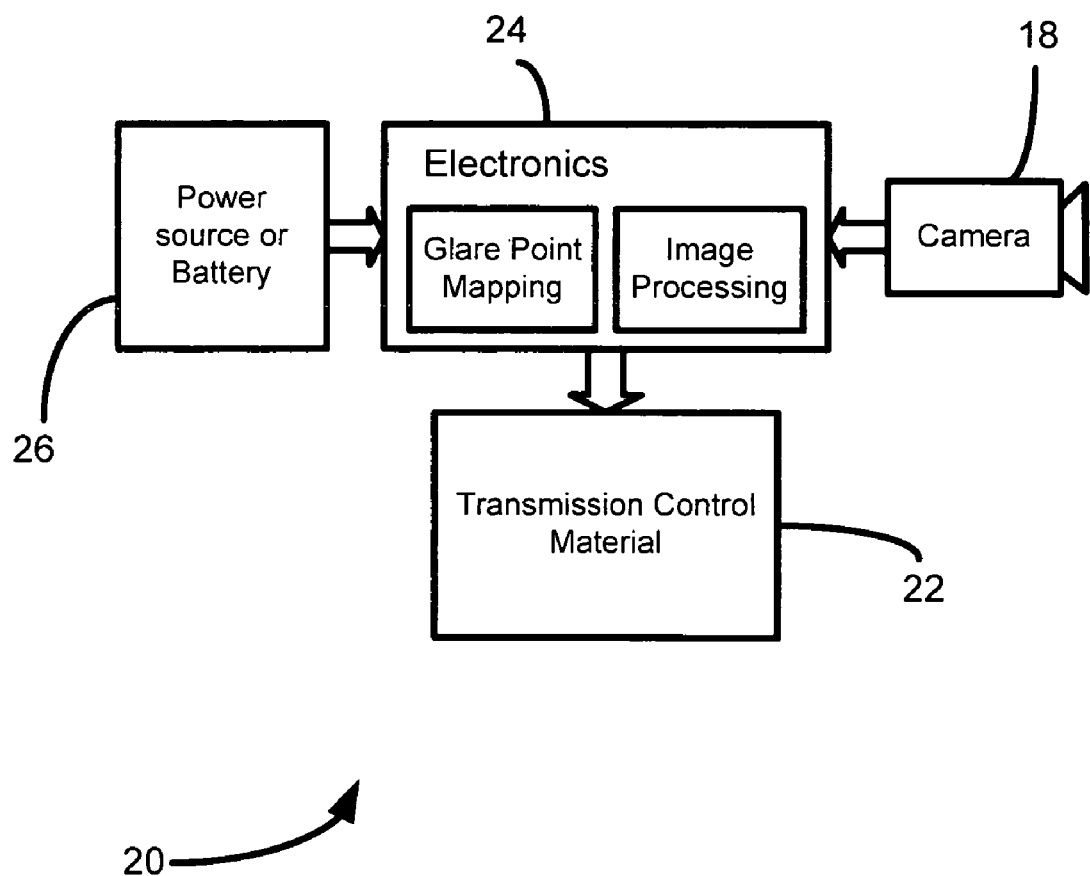
FIG. 4 is a simplified block diagram illustrating the functionality of selected components of the glare blocking system of the present invention.

FIG. 4 is a simplified block diagram illustrating the functionality of selected components of the glare blocking system 20 of the present invention. The electronics module 24 provides two key functions, image processing of images captured from the CCD camera 18 and glare point mapping upon the transmission control material 22. The power source 26 (e.g., battery) provides power to the electronics module and camera, thereby allowing the goggles to be a stand-alone apparatus.

The CCD camera 18 views the object 32 that the user's eye is pointed at (if the user is looking straight ahead). The camera 18 sees the same glare spot or spots that the user's eyes are seeing. Obviously, the location of the glare spot seen by the camera within the capture image of the camera is different from the location as seen by the user's eyes. The electronics module 24 knows the relative positions of the eyes, transmission control material of each lens and the camera. With this information and using perspective geometric techniques, the glare spot locations from the CCD camera images are mapped to the corresponding spots on the left lens 14 and the right lens 16 by the electronics module. These mapped areas upon the transmission control material of the lenses are darkened and returned to normal when no glare is detected. As a result, the user would see the object 32 without any glare. If there is more than one glare spot, the CCD camera detects the multiple glare spots and provides multiple darkened areas corresponding to the multiple glare spots.

Figure 14:
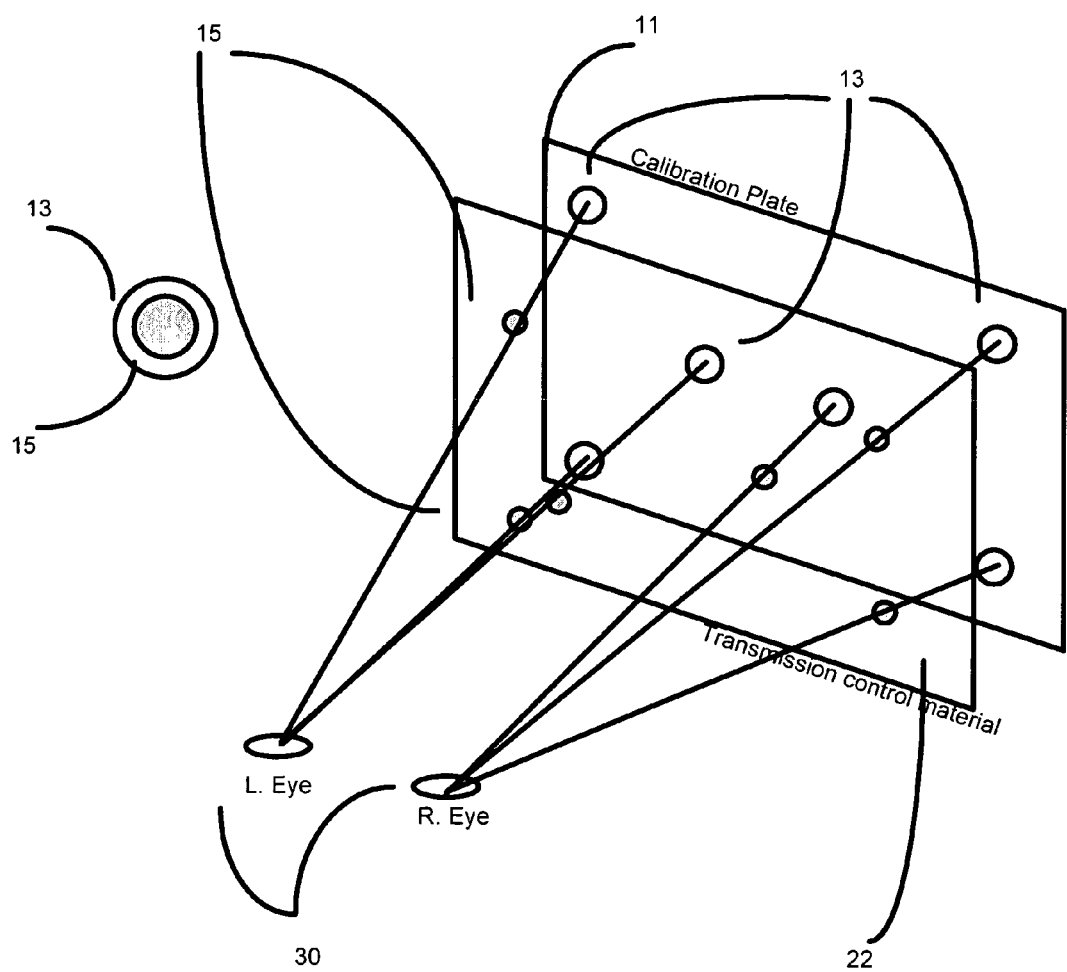
FIG. 14 is an illustration of a calibration plate used for calibration in the preferred embodiment of the present invention.

Prior to use, a calibration procedure may be conducted whereby the position of the eye with respect to the entire goggle 10 may be calculated. During calibration, a transparent calibration plate 11 having pre-marked rings 13 in known positions is attached to the transmission control material 22 on a side opposite of the user. Spots 15 may then be displayed on the transmission control material. The user may then adjust the position of these displayed spots to line up with the marked rings on the calibration plate. Preferably, at least three spots are used for each eye. By extrapolating the line passing through the spot and the ring for all three spots, the position of the eye is determined as shown in FIG. 14. Alternatively, the position of the eye with respect to the goggles is approximated using average eye spacing in normal persons. Using this approach, the entire mapping and calibration procedure is simplified. The calibration technique discussed above may be utilized on any of the embodiments of the present invention.

Figure 17:
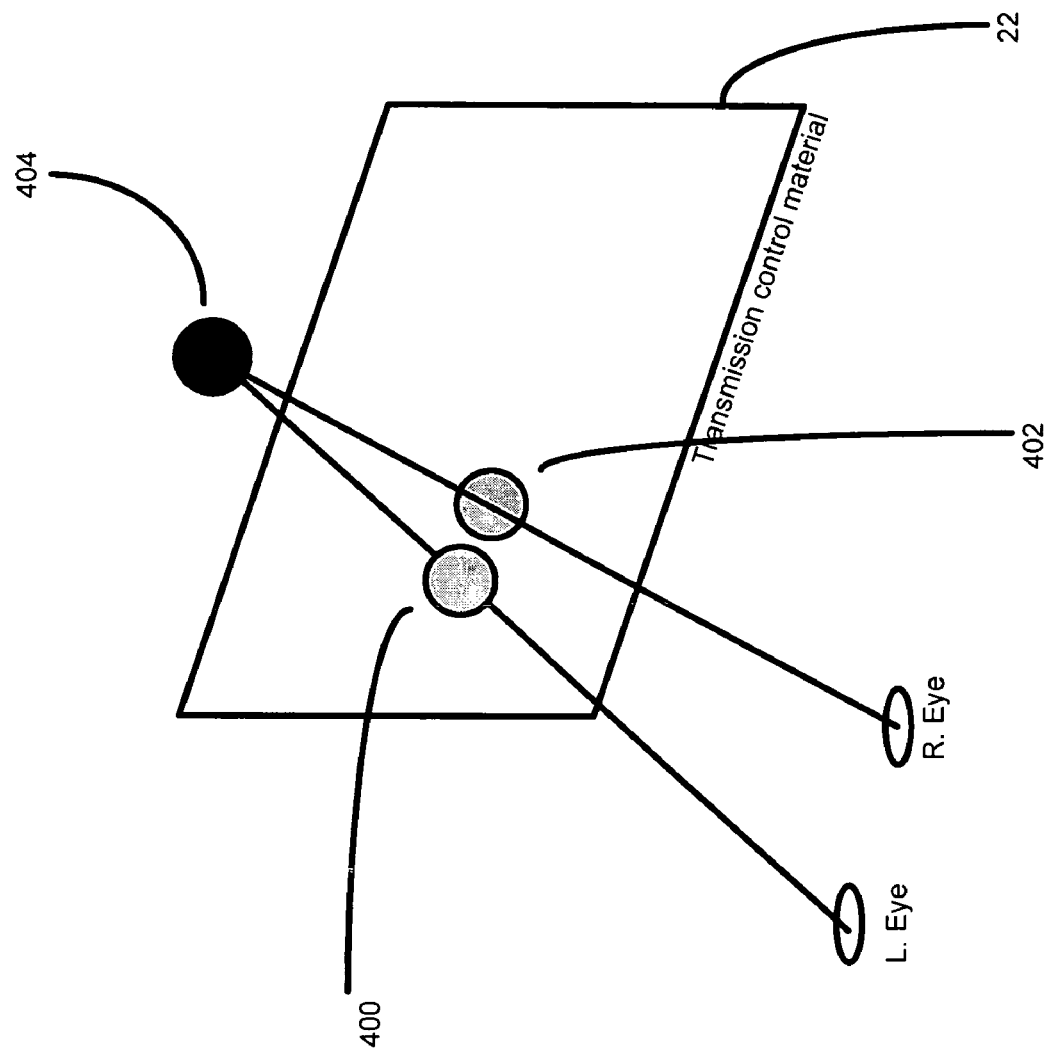
FIG. 17 is an illustration for calibration in an alternate embodiment of the present invention.

Alternatively, calibration may be accomplished while viewing a momentarily static object such as the sun. FIG. 17 is an illustration for calibration in an alternate embodiment of the present invention. The user may manually move glare block spots 400 and 402 on the transmission control material 22 for each eye. By extrapolating the position of a static object 404 as seen by the camera and the glare block spots may provide a proper calibration of the position of the eyes.

Figure 15:
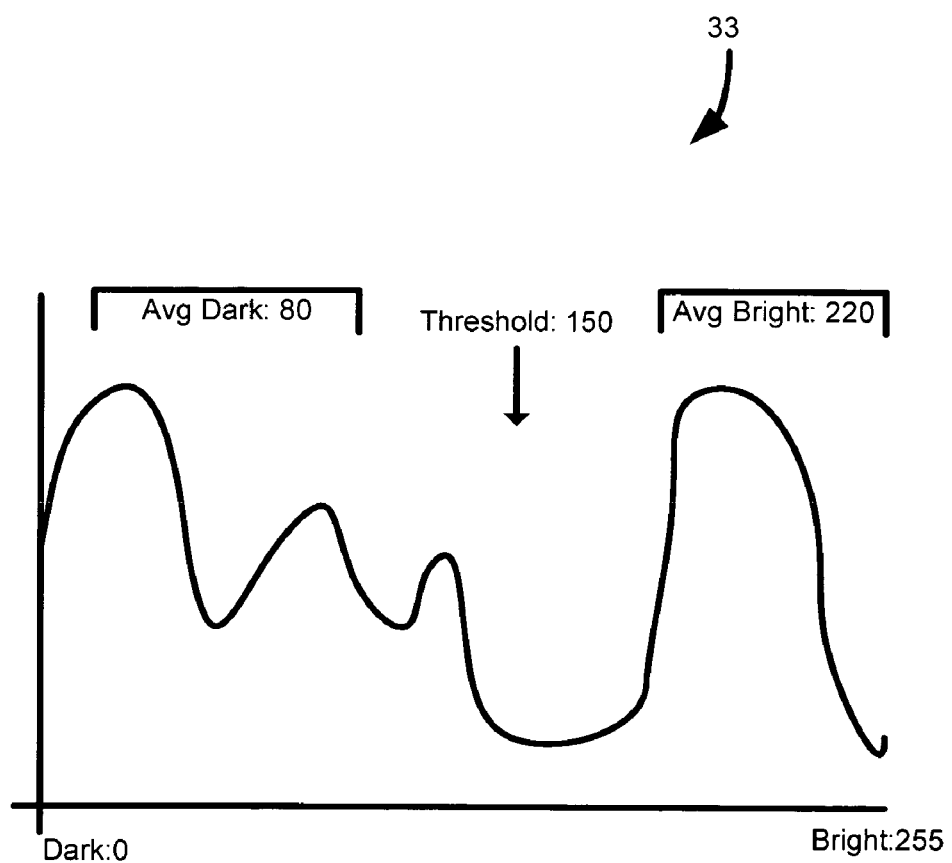
FIG. 15 illustrates an exemplary histogram.

The image of the object 32 captured by the CCD camera 18 is sent to the electronics module 24. The electronics module then identified bright spots on the captured image. The spots are identified either by determining areas that are saturated with light or by using histograms. A dynamic threshold may be applied to separate the glare intensities from other intensities. FIG. 15 illustrates an exemplary histogram 33. The average dark areas and average bright areas are computed using the histogram (intensity distribution in the image). The dynamic threshold may then be computed using mid-intensity between dark and bright areas. Once the glare intensities are identified, the areas of the captured image having glare are marked. The images are processed in real-time to dynamically block the glare from a moving object (or when the user is moving).

The glare spots of the captured image are then mapped to areas on the transmission control material 22 (i.e., left lens 14 and right lens 16). Since the distance of glare objects (e.g., sun or care in the opposite lane) are much greater in relation to the distance between the camera 18 and the eye 30, the distance from the glare object is assumed to be at a distance of infinite for calculation purposes. The other distances between the camera, transmission control material and the user's eyes are already known. Actual mapping is done using perspective geometry techniques. Upon determining the locations on the transmission control material where the glare spots must be blocked, the pixels of the transmission control material are darkened by the electronics module 24.

If the glare blocking system 20 does not utilize calibration, the blocked glare areas on the transmission control screen may be slightly larger than the actual glare spot. This ensures that the glare is still blocked even with mapping errors or with slight movement of the user with respect to the CCD camera 18. FIG. 5A illustrates a location of the glare spot as seen by the CCD camera 18. FIG. 5B illustrates an image mapped upon the transmission control material 22 as seen by the right eye of the user. FIG. 5C illustrates an image mapped upon the transmission control material 22 as seen by the left eye of the user. Thus, the transmission control material of each lens blocks the glare spot at a different location on the lens.

Figure 16:
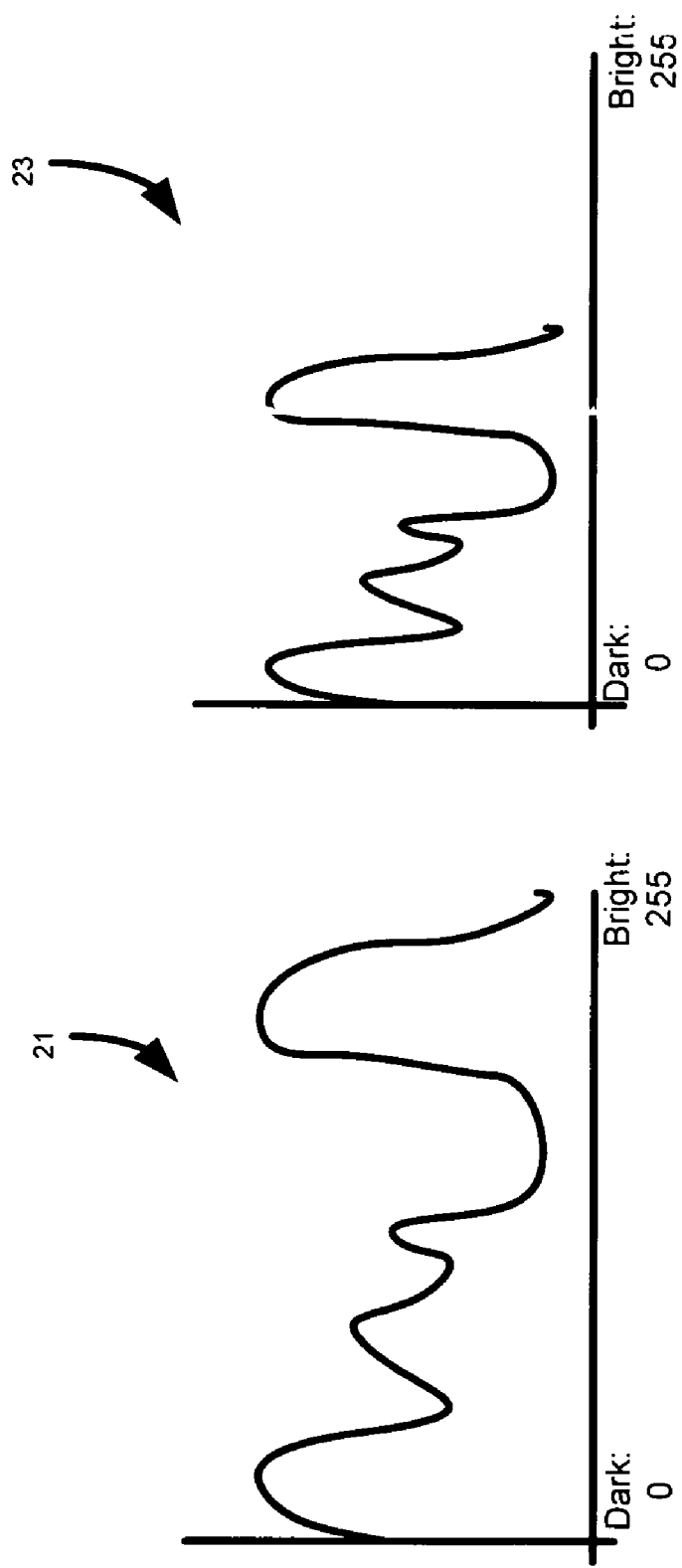
FIG. 16 illustrates a histogram and an adjusted histogram.

Alternatively, the non-uniform brightness of the image is equalized using a histogram adjustment technique. With this technique, the transmission control material is darkened to different grayscales based on the brightness of the object viewed. This makes the image more uniform and enhances the dark areas. With this technique, a more uniform image is produced in addition to blocking the glare. FIG. 16 illustrates a histogram 21 and an adjusted histogram 23. The histogram 21 includes bright areas and dark areas. The bright areas tend to blind the user and make the visibility poor in darker areas. By changing the intensities in the transmission control material, thereby adjusting the histogram, the bright areas of the image are pushed towards the dark areas. As seen in histogram 23, the image seen by the user tends to have a less blinding effect upon the user in the darker areas. Although the image becomes darker as the user's pupils adjust to the new light level, the user is able to see in the darker areas.

The goggles 10 of the present invention provide a very low cost modular solution. The goggles utilized a small amount of transmission control material versus a visor, thus reducing the cost of the entire apparatus. Since the position of the unit is relatively fixed with respect to the eyes, the mapping function performed by the electronics module 24 is simplified, thereby reducing the cost further. Additionally, by utilizing a separate power source, such as a battery, the goggles become a stand-alone apparatus.

Figure 6A:
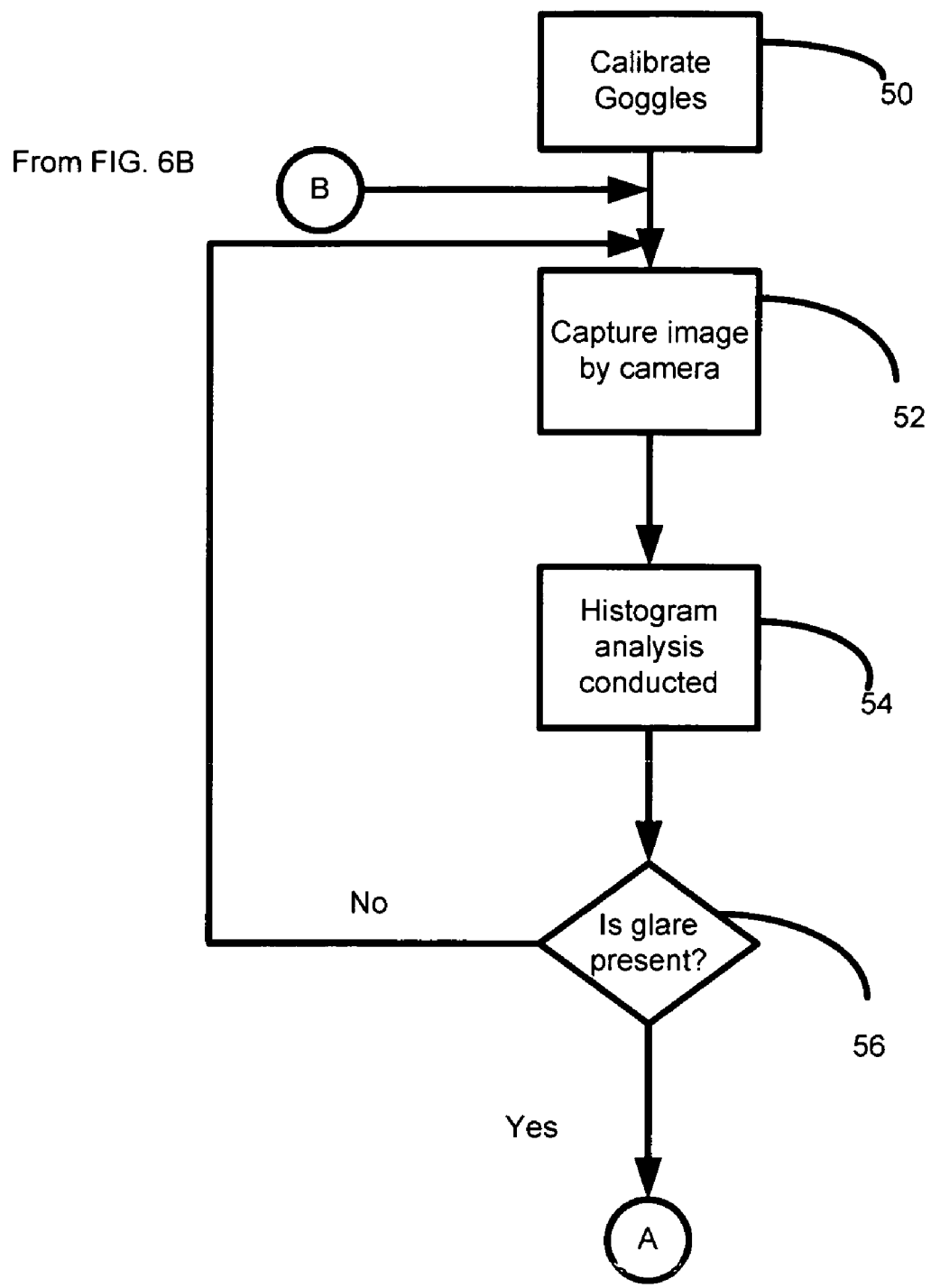
FIGS. 6A-6B are flow charts outlining the steps for blocking glare spots on the goggles according to the teachings of the present invention.
Figure 6B:
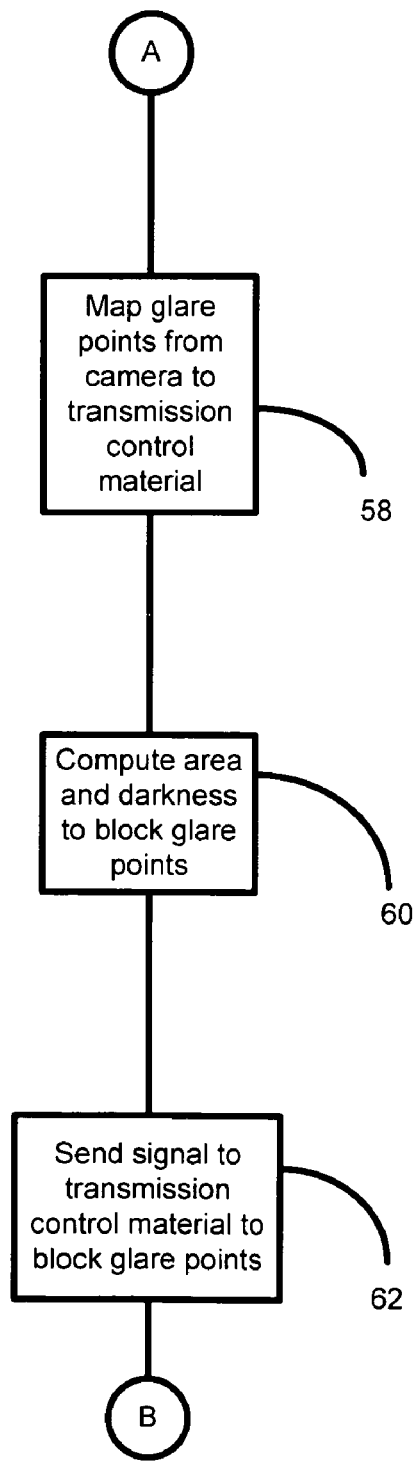

FIGS. 6A-6B are flow charts outlining the steps for blocking glare spots on the goggles according to the teachings of the present invention. With reference to FIGS. 1-6 and 14 the steps of the method will now be explained. The method begins in step 50 where the goggles are optionally calibrated. The calibration procedure is conducted to determine the position of the eye with respect to the entire goggle 10. During calibration, a transparent calibration plate 11 having pre-marked rings 13 in known positions is attached to the transmission control material 22 on a side opposite of the user. Spots 15 may then be displayed on the transmission control material. The user may then adjust the position of these displayed spots to line up with the marked rings on the calibration plate. Preferably, at least three spots are used for each eye. By extrapolating the line passing through the spot and the ring for all three spots, the position of the eye is determined as shown in FIG. 14. Alternatively, the position of the eye with respect to the goggles is approximated using average eye spacing in normal persons. Using this approach, the entire mapping and calibration procedure is simplified.

The method then moves to step 52 where the CCD camera 18 captures an image of the object 32. Next, in step 54, a histogram analysis is optionally utilized to determine the glare spots. The method then moves to step 56 where it is determined by the electronics module if glare is present in the captured image. If there is no glare present, the method moves from step 56 back to step 52.

However, in step 56, if it is determined that there is glare present, the method then moves to step 58 where the glare spots determined in step 54 are mapped upon the transmission control material 22 (lenses of goggles). Next, in step 60, the size and location on the transmission control material to be darkened is computed. In step 62, the electronics module 24 sends a signal to the transmission control material to block the glare areas. The method then moves to step 52 where the method is repeated to provide a dynamic process for blocking specific glare spots on the lenses of the goggles.

In this first preferred embodiment, the goggles provide a low cost and compact apparatus for selectively blocking specified glare spots. The goggles provide separate material for each eye which independently glare block for each eye. A camera is preferably built into the goggles. With the fixed position of the lenses, camera and each eye of the user with respect to each other, hardware complexity in mapping glare spot locations is reduced. The goggles may utilize rechargeable batteries, which enable the goggles to be compact and stand-alone. In addition, the transmission control material may include controls for varying the intensity and the color of the whole transmission control material to be darkened.

Figure 7:
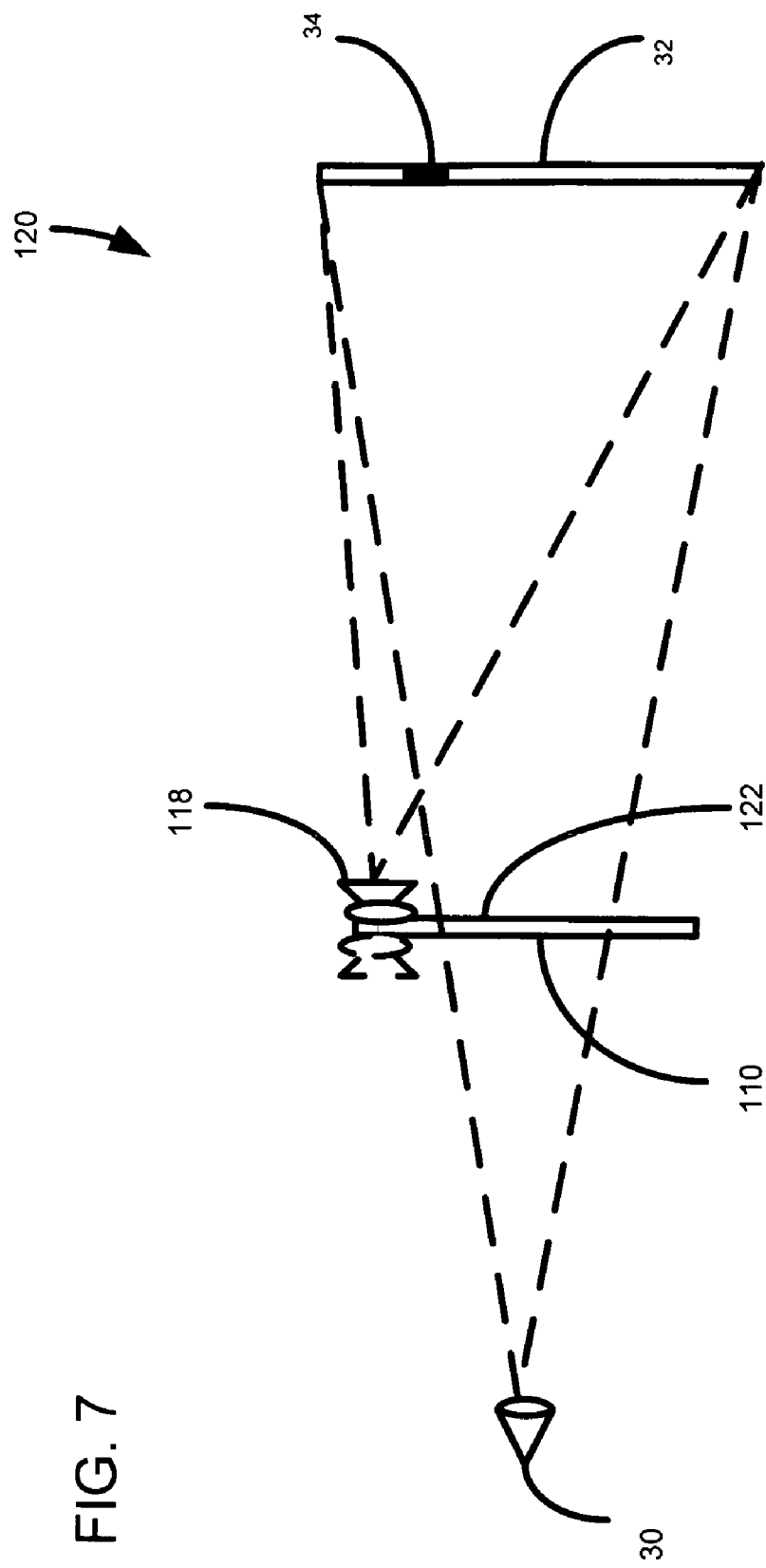
FIG. 7 is a simplified block diagram of a selective glare blocking system utilized for a visor in a first alternate embodiment of the present invention.

In a first alternate embodiment of the present invention, a visor 110 may be utilized to selective block glare spots. FIG. 7 is a simplified block diagram of a selective glare blocking system 120 utilized for the visor 110 in a first alternate embodiment of the present invention. The system includes a transmission control material 122, an electronics module 124 having a processor (not shown), and a CCD camera 118. Unlike the goggles 10, the visor includes a single transmission control material 122 panel. Although not show, the system 120 includes a power source.

As shown in FIG. 7, the user's eyes 30 is located on one side of the transmission control material. For ease of understanding, only one eye is shown, however it should be understood that the system 120 is for use of both eyes of the user. Upon the opposite side from the user is the object 32.

Figure 8:
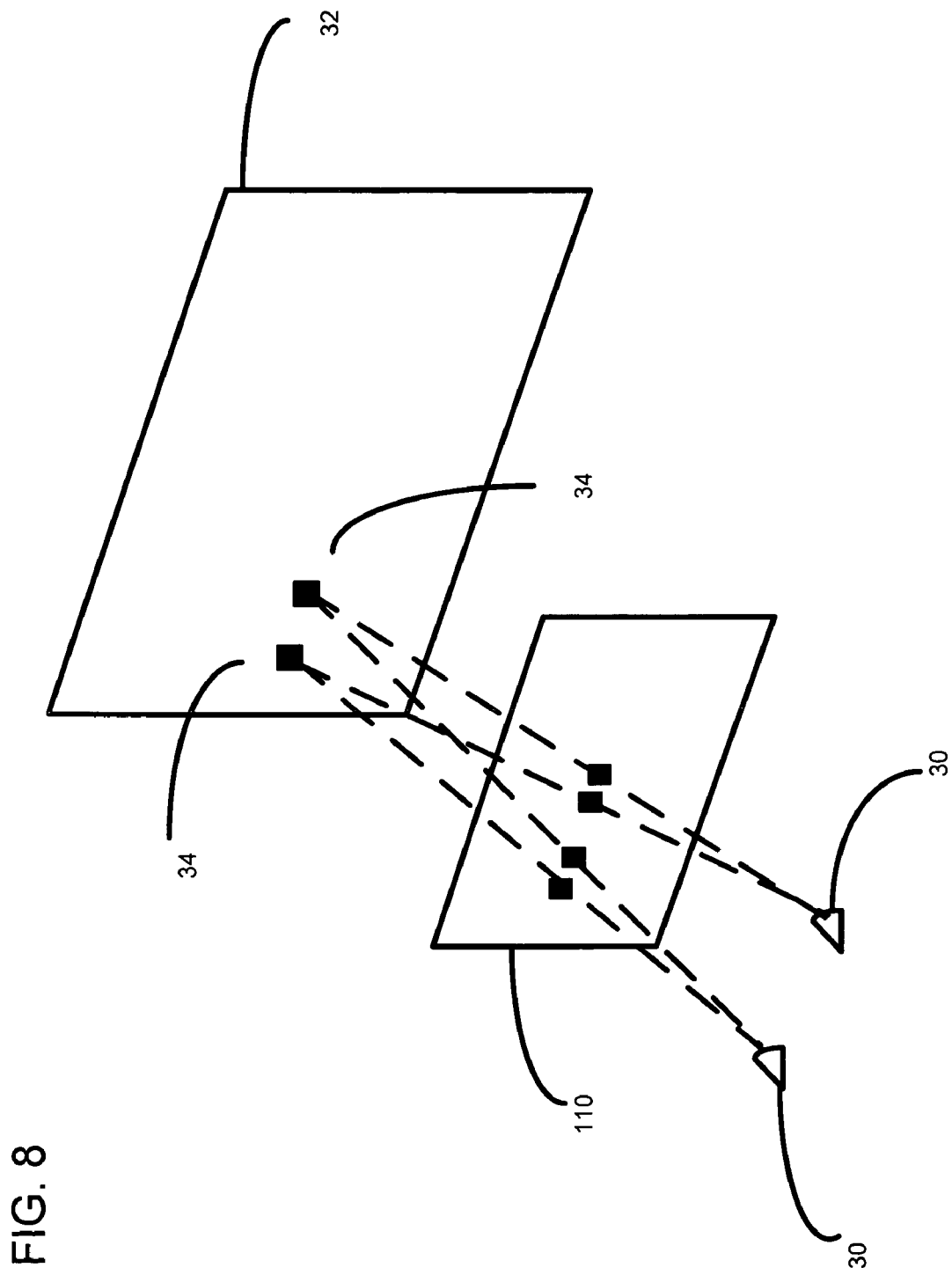
FIG. 8 is a perspective front view of the user's eyes viewing glare spots through the transmission control material in the first alternate embodiment of the present invention.

FIG. 8 is a perspective front view of the user's eyes 30 viewing glare spots 140 and 142 through the transmission control material 122 in the first alternate embodiment of the present invention. The CCD camera 118 views the object 32 that the user's eye is pointed at (if the user is looking straight ahead). The camera 118 captures an image which sees the same glare spot or spots that the user's eyes are seeing. Obviously, the location of the glare spot seen by the camera within the capture image of the camera is different from the location as seen by the user's eyes. The electronics module 24 knows the relative positions of the eyes, transmission control material and the camera. With this information and using perspective geometric techniques, the glare spot locations detected from the CCD camera images are mapped to the corresponding spots on the transmission control material of the visor 110. These mapped areas upon the transmission control material would be darkened. When the glare is removed, the material returns to normal. As a result, the user would see the object 32 without any glare. If there is more than one glare spot, the CCD camera detects the multiple glare spots and provides multiple darkened areas corresponding to the multiple glare spots.

Prior to use, a calibration procedure may be conducted whereby the position of the eye with respect to the visor may be calculated. As discussed in FIG. 14, during calibration, a transparent calibration plate having pre-marked rings 13 in known positions is attached to the transmission control material on a side opposite of the user. Spots 15 may then be displayed on the transmission control material. The user may then adjust the position of these displayed spots to line up with the marked rings on the calibration plate. Preferably, at least three spots are used for each eye. By extrapolating the line passing through the spot and the ring for all three spots, the position of the eye is determined as shown in FIG. 14. Alternatively, the position of the eye with respect to the goggles is approximated using average eye spacing in normal persons. Using this approach, the entire mapping and calibration procedure is simplified.

Alternatively, calibration may be accomplished while viewing a momentarily static object such as the sun. FIG. 17 is an illustration for calibration in an alternate embodiment of the present invention. The user may manually move glare block spots 400 and 402 on the transmission control material for each eye. By extrapolating the position of a static object 404 as seen by the camera and the glare block spots may provide a proper calibration of the position of the eyes.

The image of the object 32 captured by the CCD camera 118 is sent to the electronics module 124. The electronics module then identifies bright spots on the captured image. The spots are identified either by determining areas that are saturated with light or by using histograms. A dynamic threshold may be applied to separate the glare intensities from other intensities. Once the glare intensities are identified, the areas of the captured image having glare are marked. The images are processed in real-time to dynamically block the glare from a moving object (or when the user is moving).

The glare spots of the captured image are then mapped to areas on the transmission control material 122 of the visor 110. Since the distance of glare objects (e.g., sun or care in the opposite lane) are much greater in relation to the distance between the camera 118 and the eye 30, the distance from the glare object is assumed to be at a distance of infinite for calculation purposes. The other distances between the camera, transmission control material and the user's eyes are already known. Actual mapping is done using perspective geometry techniques. Upon determining the locations on the transmission control material where the glare spots must be blocked, the pixels of the transmission control material are darkened by the electronics module 124.

If the glare blocking system 120 does not utilize calibration, the blocked glare areas on the transmission control screen may be slightly larger than the actual glare spot. This ensures that the glare is still blocked even with mapping errors or with slight movement of the user with respect to the CCD camera 118.

Alternatively, the non-uniform brightness of the image is equalized using a histogram adjustment technique. With this technique, the transmission control material is greatly darkened in bright areas and lightly darkened in medium bright areas. This makes the image more uniform and enhances the dark areas. With this technique, a more uniform image is produced in addition to blocking the glare.

Figure 9B:
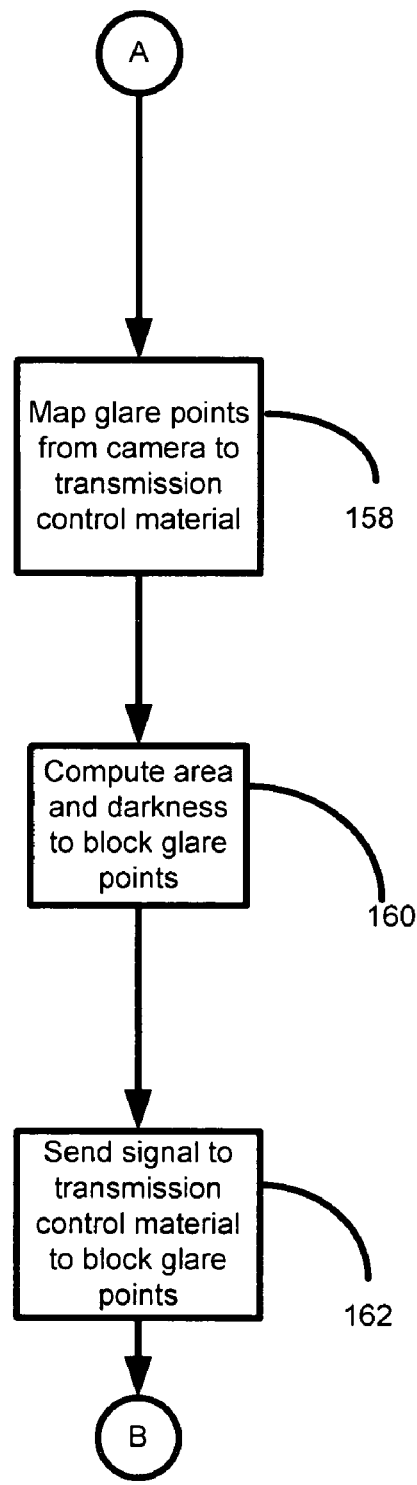

FIGS. 9A-9B are flow charts outlining the steps for blocking glare spots on the visors in the first alternate embodiment of the present invention. With reference to FIGS. 7-9, the steps of the method will now be explained. The method begins in step 150 where the visor is optionally calibrated. The calibration procedure is conducted to determine the position of the eye with respect to the transmission control material 122. During calibration, a transparent calibration plate 11 having pre-marked rings 13 in known positions is attached to the transmission control material 22 on a side opposite of the user. Spots 15 may then be displayed on the transmission control material. The user may then adjust the position of these displayed spots to line up with the marked rings on the calibration plate. Preferably, at least three spots are used for each eye. By extrapolating the line passing through the spot and the ring for all three spots, the position of the eye is determined as shown in FIG. 14. Alternatively, calibration may be accomplished while viewing a momentarily static object such as the sun. FIG. 17 is an illustration for calibration in an alternate embodiment of the present invention. The user may manually move glare block spots 400 and 402 on the transmission control material for each eye. By extrapolating the position of a static object 404 as seen by the camera and the glare block spots may provide a proper calibration of the position of the eyes. In an alternate calibration process, the position of the eye with respect to the transmission control material is approximated using average eye spacing in normal persons. Using this approach, the entire mapping and calibration procedure is simplified. The method then moves to step 152 where the CCD camera 118 captures an image of the object 32. Next, in step 154, a histogram analysis is optionally utilized to determine the glare spots. The method then moves to step 156 where it is determined by the electronics module if glare is present in the captured image. If there is no glare present, the method moves from step 156 back to step 152.

However, in step 156, if it is determined that there is glare present, the method then moves to step 158 where the glare spots determined in step 154 are mapped upon the transmission control material 122 (visor). Next, in step 160, the size and location on the transmission control material to be darkened is computed. In step 162, the electronics module 124 sends a signal to the transmission control material to block the glare areas. The method then moves to step 152 where the method is repeated to provide a dynamic process for blocking specific glare spots on the visor.

In an alternate embodiment of the visor 110, a second CCD camera may be utilized to track the eye position relative to the transmission control material. This process may be completed through the use of the geometric shape based machine vision techniques. The shapes of the human eye may then be detected in the field of view by detecting all the geometric shapes in the captured image and searching for human eye shapes. In addition, during night time operations, an additional infrared illumination may be utilized to illuminate the eyes. Specular reflection from the eyes may make the eyes brighter than the rest of the areas. This illumination may also produce red eyes form the retina of the eyes due to the eyes having open pupils. This may further aid in detecting the eyes. In addition, the transmission control material may include controls for varying the intensity and the color of the area to be darkened.

Figure 10:
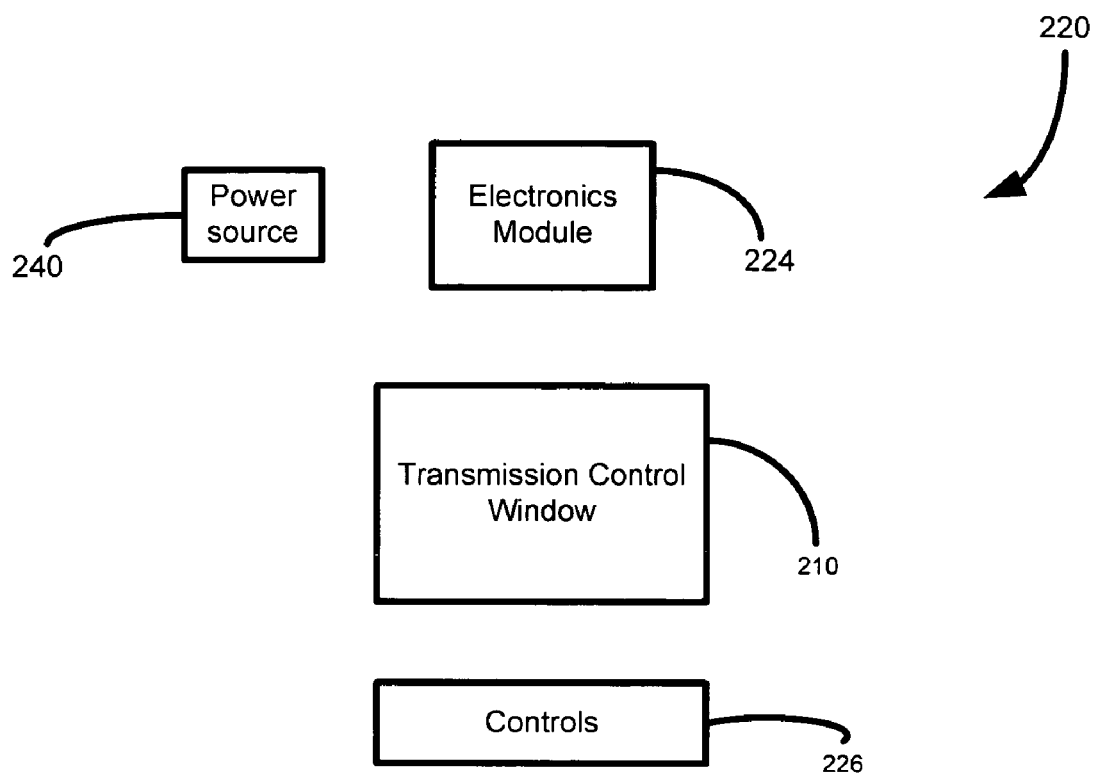
FIG. 10 is a simplified block diagram of a selective glare blocking system utilized for the transmission control window in a second alternate embodiment of the present invention.

In a second alternate embodiment of the present invention, a transmission control window 210 having manual controls, which do not require the use of a camera, may be utilized to selectively block a glare spot. FIG. 10 is a simplified block diagram of a selective glare blocking system 220 utilized for the transmission control window 210 in a second alternate embodiment of the present invention. The system includes the transmission control window 210, an electronics module 224 having a processor (not shown), a plurality of controls 226 to control the position and area to be blocked on the transmission control window 210, and a power supply 240. The transmission control window 210 is particular useful when the glare position is relatively fixed, such as glare due to the morning or evening sun. The transmission control window 210 provides a low cost solution by using this manually controlled glare blocking system. This is particularly useful in applications such as aviation where a pilot manually controls the glare blocking position and area through one or more cockpit windows or by pilots navigating on ships.

Figure 11:
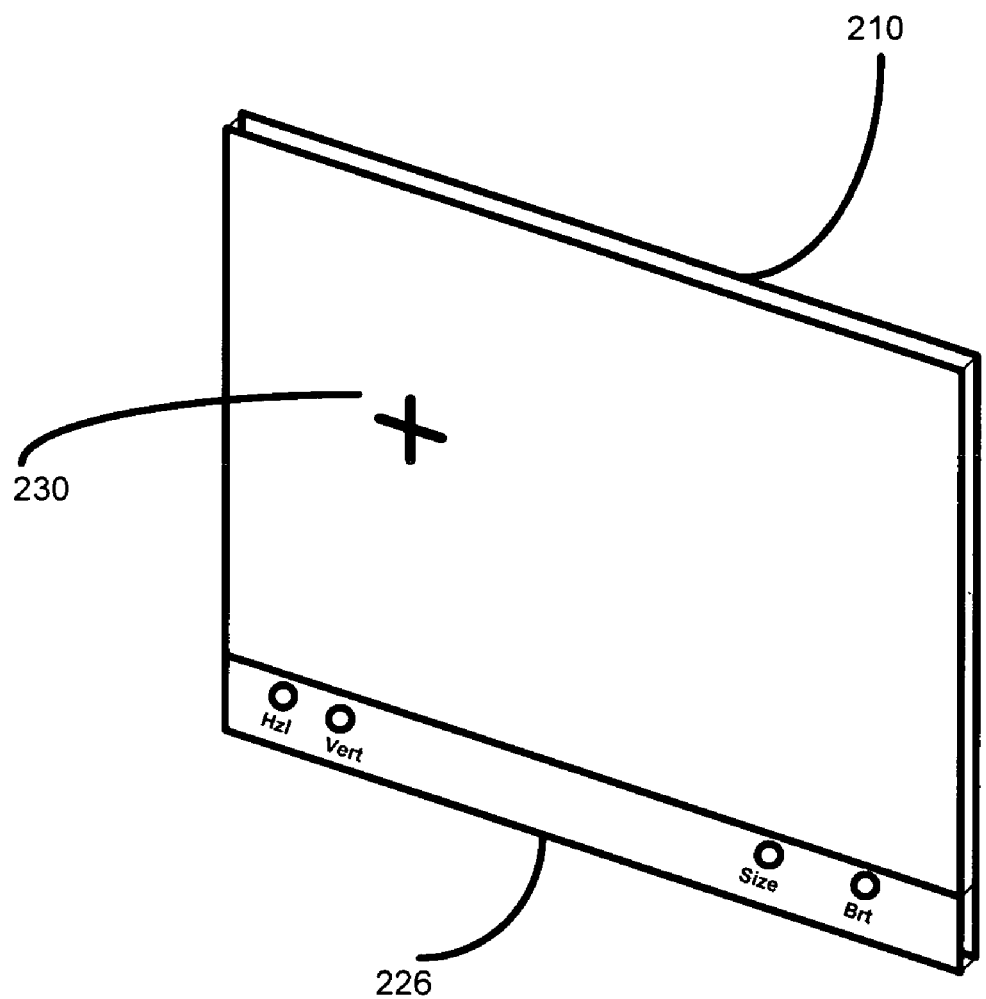
FIG. 11 is a front perspective view of the transmission control window of FIG. 10 in the second alternate embodiment of the present invention.

FIG. 11 is a front perspective view of the transmission control window 210 of FIG. 10 in the second alternate embodiment of the present invention. The user views objects through the transmission control window 210. A glare blocking crosshairs 230 may illustrate the location of the glare blocking area. The location (horizontal and vertical axis) and the size of the glare blocking area is controlled by the user with the plurality of controls 226. Additionally, other controls may include a brightness knob to control the intensity of the glare reduction.

Alternatively to utilizing the plurality of controls 226, the system 220 may utilize touch-screen technology which may be used to mark the glare blocking areas. For example, the user may touch the areas on the transmission control window 210 where glare is detected. The area touched by the user may then be darkened. In addition, the transmission control material may include controls for varying the intensity and the color of the area to be darkened.

Figure 12:
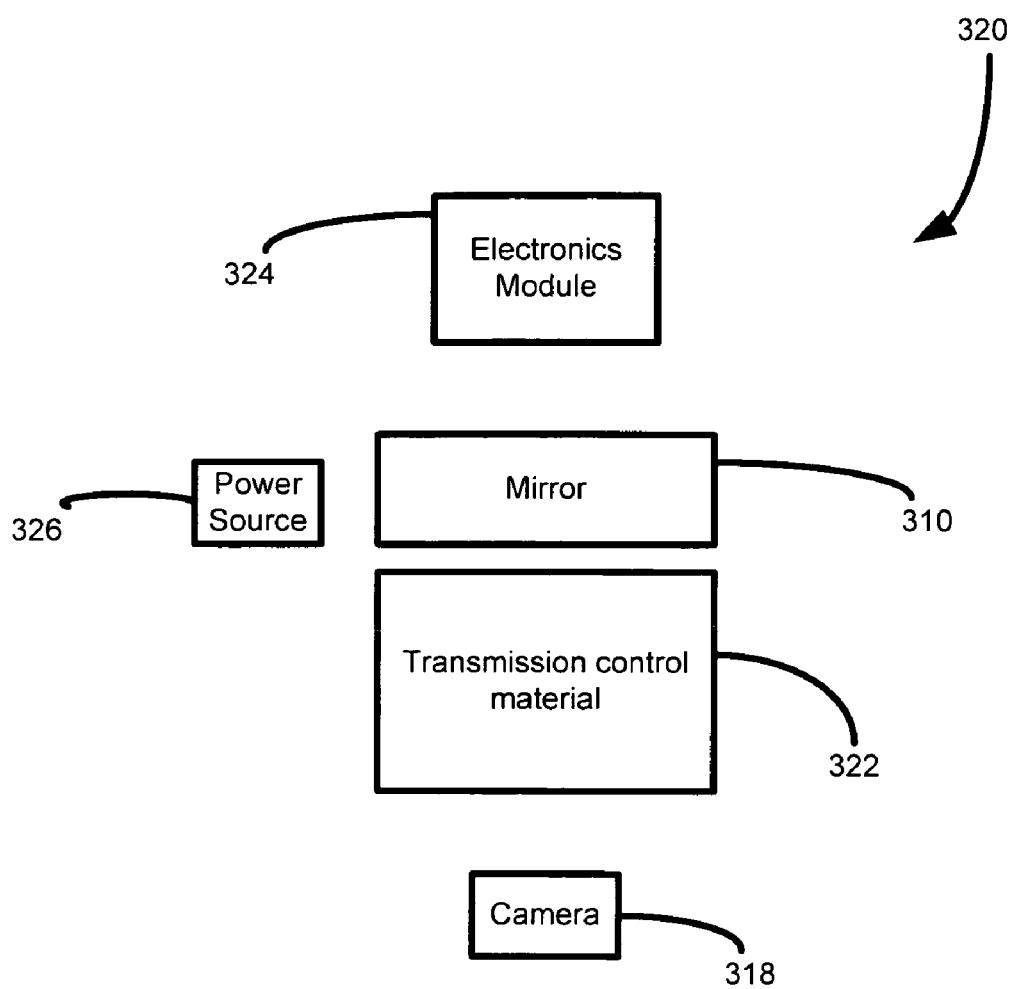
FIG. 12 is a simplified block diagram of a selective glare blocking system utilized for the mirror in a third alternate embodiment of the present invention.

In a third alternate embodiment of the present invention, a mirror 310 having a transmission control material window 312 may be utilized to selectively block glare in the mirror. FIG. 12 is a simplified block diagram of a selective glare blocking system 320 utilized for the mirror 310 in a third alternate embodiment of the present invention. The system includes a transmission control material 322 within the mirror 310, an electronics module 324 having a processor (not shown), and a CCD camera 318. The system may be powered by a power source 326.

Figure 13:
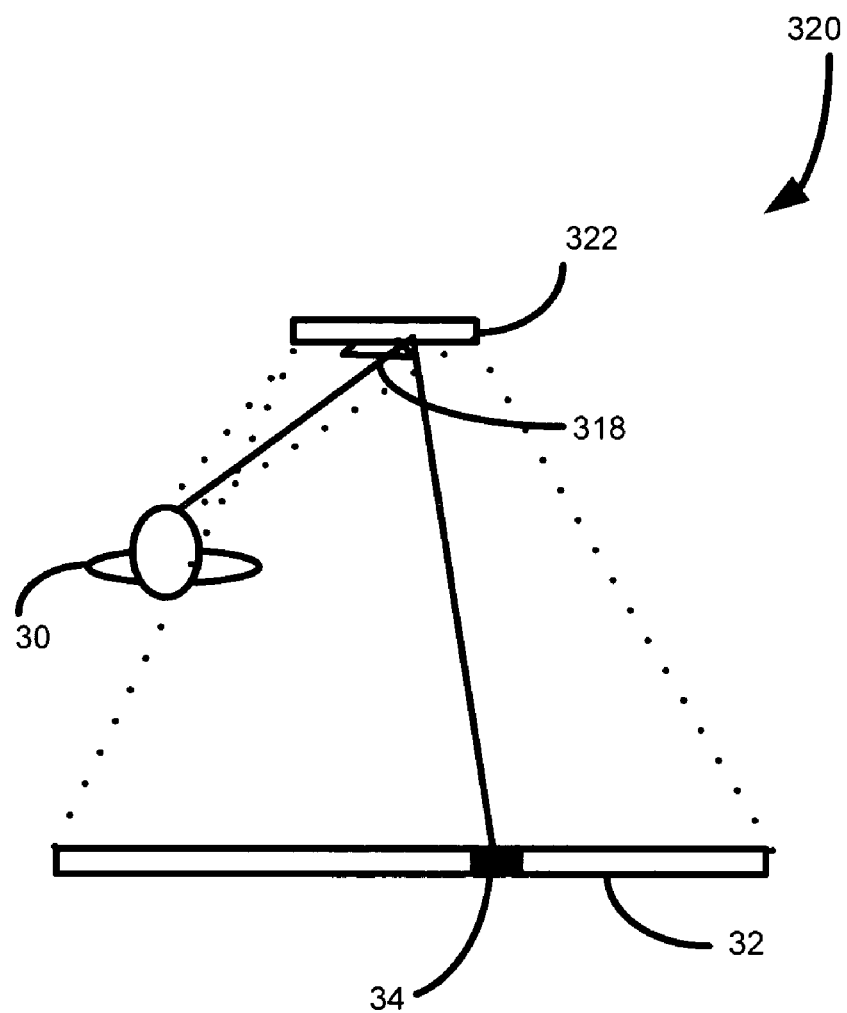
FIG. 13 illustrates a top view of the glare blocking system in the third alternate embodiment of the present invention.

FIG. 13 illustrates a top view of the glare blocking system 320 in the third alternate embodiment of the present invention. A user eye 30 views an image 352 of an object 32. The mirror utilizes the CCD camera to determine the location of the glare spots. The CCD camera 318 views the object 32 viewed by the mirror. Obviously, the location of the glare spot seen by the camera within the capture image of the camera is different from the location as seen by the user's eyes. The electronics module 324 knows the relative positions of the eyes, transmission control material and the camera. With this information and using perspective geometric techniques, the glare spot locations form the CCD camera images are mapped to the corresponding spots on the transmission control material of the mirror 310. These mapped areas upon the transmission control material would be darkened. As a result, the user sees the object 32 through the mirror without any glare. If there is more than one glare spot, the CCD camera detects the multiple glare spots and provides multiple darkened areas corresponding to the multiple glare spots.

Prior to use, a calibration procedure similar to the calibration process for the other embodiments may be conducted. Once calibration is complete, the horizontal and vertical position of each eye of the user is known. Alternatively, the position of the eye with respect to the mirror is approximated using average eye spacing in normal persons. Using this approach, the entire mapping and calibration procedure is simplified. During the calibration process for the mirror 310, in addition to finding the horizontal and vertical position of the eye, the distance to the eye from the transmission control material 322 is calculated by preferably using either a laser or dual eye mapping.

The image of the object 32 captured by the CCD camera 318 is sent to the electronics module 324. The electronics module then identifies bright spots on the captured image. The spots are identified either by determining areas that are saturated with light or by using histograms. A dynamic threshold may be applied to separate the glare intensities from other intensities. Once the glare intensities are identified, the areas of the captured image having glare are marked. The images are processed in real-time to dynamically block the glare from a moving object (or when the user is moving).

The glare spots of the captured image are then mapped to areas on the transmission control material 322 of the mirror 310. Actual mapping is done using perspective geometry techniques. Upon determining the locations on the transmission control material where the glare spots must be blocked, the pixels of the transmission control material are darkened by the electronics module 324.

Alternatively, the non-uniform brightness of the image is equalized using a histogram adjustment technique. With this technique, the transmission control material is greatly darkened in bright areas and lightly darkened in medium bright areas. This makes the image more uniform and enhances the dark areas. With this technique, a more uniform image is produced in addition to blocking the glare. In addition, the transmission control material may include controls for varying the intensity and the color of the area to be darkened.

The present invention provides many advantages over existing systems. The present invention may utilize histograms to detect the glare from the camera image. Background intensity, glare intensity and threshold are determined from the histogram. The histogram adjustment technique provides a very uniform view for the user. Very bright areas are reduced in brightness while medium bright areas are lightly lowered in brightness and dark areas become more visible. Eye tracking using edge based techniques to search for human eye shapes in the field of view may be utilized. Eye tracking in the night time may utilize specular reflection from the eye balls and red-eye from the retina of the eye. The present invention may be utilized in aircraft, ships or any type of transportation or outdoor activation. The present invention may also be used in activities involving high intensity light, such as welding. In addition, the transmission control material may be utilized on a car visor. The present invention may be utilized to enhance vision for military operations. Additionally, the present invention may utilize fixed mapping using approximate positions for each eye. Larger areas of glare blocking may then be utilized to compensate for the error in eye position. The present invention also provides a display which provides useful information on the transmission control material by making areas darker around the letters to be displayed. This information could be utilized for a digital compass, temperature, time, GPS or lane change warning or any other useful information. In addition, the transmission control material may include controls for varying the intensity and the color of the area to be darkened.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A glare blocking system for selectively blocking specified glare spots, the system comprising:
   a transmission control material for selectively darkening a portion of the material;
   an electronic module for commanding the transmission control material to darken a specified area of the transmission control material;
   a power source providing power to the electronic module and the transmission control material; means for determining the specified area upon the transmission control material to block a detected glare spot from view by a user, wherein the electronic module using the user's eye position, position of the transmission control material and the camera to determine the specific area upon the transmission control material to block the detected glare; and
   means for calibrating an eye position of the user in relation to the transmission control material, the means for calibrating an eye position of the user includes using a substantially static object seen through the transmission control material and manually moving the specified area to darken to block the static object and extrapolating the position of the static object as seen from the camera thereby aligning the transmission control material relative to the eyes of the user;
   whereby the specified area to be darkened corresponding to a detected glare spot is determined and the electronic module directs the specified area of the transmission control material to be darkened to block the detected glare spot from view by the user.

2. The glare blocking system of claim 1 wherein:
   the transmission control material is two separate lenses within goggles;
   the means for determining the specified area upon the transmission control material includes a camera for capturing an image and detecting a glare spot on the image; and
   the electronic module maps the detected glare spot on each lens, the mapped glare spot being the specified area to be darkened to block the detected glare spot from view by the user of the goggles, wherein each lens independently blocks glare spots from each eye of the user.

3. The glare blocking system of claim 2 wherein the detected glare spot is mapped on each lens using perspective geometric techniques.

4. The glare blocking system of claim 1 further comprising means for calibrating an eye position of the user in relation to the transmission control material, the means for calibrating an eye position of the user includes a calibration plate positioned adjacent the transmission control material, the calibration plate having alignment marks for aligning the transmission control relative to eyes of the user.

5. The glare blocking system of claim 1 wherein:
   the means for determining the specified area upon the transmission control material includes:
      using a histogram to detect glare upon the captured image;
      utilizing the histogram to equalize the non-uniform brightness of the detected glare.

6. The glare blocking system of claim 1 wherein:
   the transmission control material is a viewing panel on a visor;
   the means for determining the specified area upon the transmission control material includes a camera for capturing an image and detecting a glare spot on the image; and
   the electronic module maps the detected glare spot on the panel, the mapped glare spot being the specified area to be darkened to block the detected glare spot from view by a user of the visor.

7. The glare blocking system of claim 6 wherein the detected glare spot is mapped on the panel using perspective geometric techniques.

8. The glare blocking system of claim 6 further comprising means for calibrating an eye position of the user in relation to the transmission control material, the means for calibrating an eye position of the user includes using a substantially static object seen through the transmission control material and manually moving the specified area to darken to block the static object and extrapolating the position of the static object as seen from the camera, thereby aligning the transmission control material relative to the eyes of the user.

9. The glare blocking system of claim 6 further comprising a second camera for tracking an eye position of the user.

10. The glare blocking system of claim 1 wherein:
    the transmission control material is a viewing panel and includes a manual control to darken the specified area, whereby the user selects the specified area to darken.

11. The glare blocking system of claim 10 wherein the viewing panel is a touch-screen.

12. The glare blocking system of claim 1 wherein:
    the transmission control material is a mirror;
    the means for determining the specified area upon the transmission control material includes a camera for capturing an image and detecting a glare spot on the image and
    the electronic module maps the detected glare spot on the mirror, the mapped glare spot being the specified area to be darkened to block the detected glare spot from view by a user of the mirror.

13. The glare blocking system of claim 12 wherein the detected glare spot is mapped on a mirror using perspective geometric techniques.

14. The glare blocking system of claim 12 further comprising a second camera for tracking an eye position of the user.

15. The glare blocking system of claim 1 wherein the transmission control material is utilized in a cockpit of an aircraft.

16. A method of selectively blocking specified glare spots, the method comprising the steps of:
- capturing an image by a camera;
- conducting a histogram analysis of the capture image to determine a glare spot on the image;
- mapping a determined glare spot on a transmission control material utilizing the histogram analysis to equalize the non-uniform brightness of the image;
- computing a specified area to darken to block the glare spot on the transmission control material from view by a user; and
- sending a control signal by an electronics module to darken the specified area to block the glare spot from view by the user.

17. The method of selectively blocking specified glare spots of claim 16 wherein the transmission control material includes two lenses of goggles, wherein each lens independently blocks glare spots from each eye of the user.

18. The method of selectively blocking specified glare spots of claim 16 wherein the transmission control material is a visor.

19. The method of selectively blocking specified glare spots of claim 16 wherein the transmission control material is a mirror.

20. The method of selectively blocking specified glare spots of claim 16 wherein the transmission control material displays information by darkening areas around information displayed on the transmission control material.

21. The method of selectively blocking specified glare spots of claim 16 wherein the transmission control material is selectively darkened at different grayscales to create a more uniform image.

22. The method of selectively blocking specified glare spots of claim 16 wherein the transmission control material is manually adjusted in intensity and color.

23. The method of selectively blocking specified glare spots of claim 16 further comprising the step of tracking a position of the user's eye using shape analysis to find the shape of the user's eye in the user's field of vision.

24. The method of selectively blocking specified glare spots of claim 16 further comprising the step of illuminating a pupil of the user's eye to generate a red eye on the user to track the position of the user's eyes.

25. The method of selectively blocking specified glare spots of claim 16 further comprising the step of utilizing fixed mapping to approximate a position of the user's eye relative to the transmission control material.

* * * * *